(12) United States Patent
Jones et al.

(10) Patent No.: US 6,851,529 B2
(45) Date of Patent: Feb. 8, 2005

(54) MULTIFUNCTION VIBRATION ISOLATION STRUT

(75) Inventors: Stephen R. Jones, Glendale, AZ (US); James H. Boyd, Phoenix, AZ (US); Dale T. Ruebsamen, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 136 days.

(21) Appl. No.: 10/125,876

(22) Filed: Apr. 18, 2002

(65) Prior Publication Data

US 2003/0197318 A1 Oct. 23, 2003

(51) Int. Cl.$^7$ .................................................. F16F 7/10
(52) U.S. Cl. ................................... 188/378; 267/136
(58) Field of Search ........................... 267/64.12, 136; 188/378–380

(56) References Cited

U.S. PATENT DOCUMENTS

| | | | |
|---|---|---|---|
| 2,838,140 A | | 6/1958 | Rasmusson et al. |
| 4,407,395 A | * | 10/1983 | Suozzo ...................... 188/134 |
| 5,065,552 A | * | 11/1991 | Kobori et al. .................... 52/1 |
| 5,147,018 A | * | 9/1992 | Kobori et al. .............. 188/300 |
| 5,311,709 A | * | 5/1994 | Kobori et al. .............. 52/167.2 |
| 5,497,858 A | * | 3/1996 | Cloud et al. .................. 188/67 |
| 5,595,372 A | * | 1/1997 | Patten ....................... 267/64.13 |
| 5,803,213 A | * | 9/1998 | Davis et al. ................. 188/378 |
| 5,918,865 A | | 7/1999 | Osterberg |
| 5,947,240 A | | 9/1999 | Davis et al. |
| 6,193,223 B1 | * | 2/2001 | Jackson .................... 267/64.12 |
| 6,378,671 B1 | * | 4/2002 | Carlson .................... 188/267.2 |
| 6,521,090 B1 | | 2/2003 | Vestola et al. |

FOREIGN PATENT DOCUMENTS

| | | |
|---|---|---|
| DE | 8809306 U | 9/1988 |
| FR | 2671519 A | 7/1992 |

\* cited by examiner

*Primary Examiner*—Robert Siconolfi

(57) ABSTRACT

An isolation strut and strut support system for supporting a load and capable of operating in a first mode and a second mode comprising an air suspension spring connected to a load bearing shaft; a hydraulic damping element having a first chamber and a second chamber separated by a piston connected to the load bearing shaft. A hydraulic line has a valve therein, one end of the hydraulic line connected to the first chamber and the other end of the hydraulic line connected to the second chamber. A vibration detector is coupled to the valve for actuating the valve upon the occurrence of vibration of an abnormal quality; whereby, in a first mode of operation the load is rigidly attached to the ground via a load path through the hydraulic damping element and in a second mode the load is isolated by the air suspension spring and damped by the hydraulic damping element.

10 Claims, 5 Drawing Sheets

MULTIFUNCTION VIBRATION ISOLATION STRUT

TECHNICAL FIELD

The present invention relates to a vibration isolation strut, and more particularly to a vibration isolation strut which is rigidly mounted for normal operation but which provides isolation from vibration, particularly seismic vibration.

BACKGROUND OF THE INVENTION

In certain applications it is desirable to support a load in such a manner that the support is relatively rigid during normal operation. An example is equipment such as an antenna system for a radar installation, but other examples include buildings, structures, or other equipment. In normal use, a platform supporting the antenna is expected to provide a relatively rigid load path to the ground. Such a support is desirably relatively rigid in order to stabilize the structure for optimum performance and accuracy. Rigid supports, however, can cause damage to the supported structure in the event of violent shaking or vibration such as may be experienced during a seismic event.

In the past, vibration or motion isolations have generally acted merely to isolate the load or a platform supporting the load from anticipated vibration. Examples of such isolations are found, for example, in the inventions of U.S. Pat. No. 5,803,213, U.S. Pat. No. 5,918,865, and U.S. Pat. No. 5,947,240, all of which are assigned to the assignee of the instant invention. Each of the noted patents relates to load isolation from vibration and each utilizes air suspension springs which are damped by cross-connecting conduits to and from a pair of isolation struts.

While these devices provide vibration isolation for, for example, isolating a payload from a launch vehicle, they are not intended to provide relatively rigid support for the payload in a first mode of operation and less rigid but damped support in another mode of operation. They are intended, rather, continuously to provide isolation from vibration at all times.

The devices of the above-identified patents comprise a plurality of load isolation struts, each strut having a pneumatic cylinder, or air suspension spring, with a piston dividing the cylinder into two chambers, and a hydraulic cylinder with a second piston dividing the hydraulic cylinder into two chambers. The air suspension spring provides isolation from vibration and the hydraulic cylinder provides damping of the resulting oscillation of the air spring during vibration.

Isolation systems incorporating the above devices may comprise pairs of struts placed around the supported load, each strut having its respective hydraulic cylinders cross-coupled to the cylinders of the other strut of the pair.

While this arrangement is effective in isolating a load from vibration and for damping the effects of any such vibration, the system is intended to operate continuously in the vibration isolation and damping mode.

BRIEF SUMMARY OF THE INVENTION

The instant invention provides an isolation strut and strut support system for supporting a load and capable of operating in a first mode and a second mode comprising an air suspension spring connected to a load bearing shaft; a hydraulic damping element having a first chamber and a second chamber separated by a piston connected to the load bearing shaft; a hydraulic line having a valve therein, one end of the hydraulic line connected to the first chamber and the other end of the hydraulic line connected to the second chamber; a vibration detector coupled to the valve for actuating the valve upon the occurrence of vibration of an abnormal quality; whereby, in a first mode of operation the load is rigidly attached to the ground via a load path through the hydraulic damping element and in a second mode the load is isolated by the air suspension spring and damped by the hydraulic damping element.

BRIEF DESCRIPTION OF THE DRAWINGS

The present invention will hereinafter be described in conjunction with the appended drawing figures, wherein like numerals denote like elements, and.

DETAILED DESCRIPTION OF PREFERRED EXEMPLARY EMBODIMENTS

The following detailed description of a preferred embodiment is merely exemplary in nature and is not intended to limit the invention or the application and uses of the invention.

A soft suspension system is required for buildings, structures, or equipment to provide isolation from severe vibration conditions, such as seismic activity, to prevent or minimize damage to such buildings, structures, or equipment. However, the buildings, structures, or equipment must otherwise be rigidly mounted for proper operation.

Figure 1:
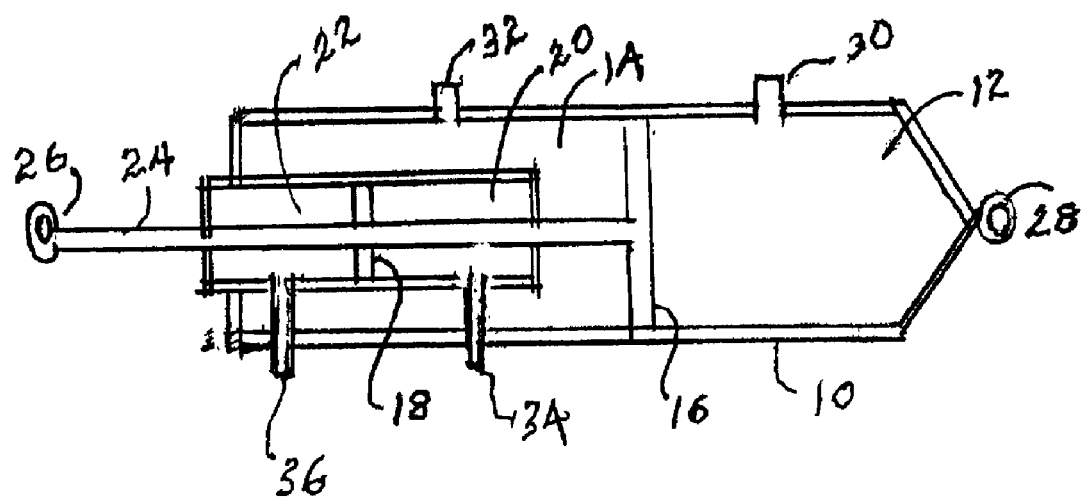
FIG. 1 shows an isolation strut usable in the instant invention.

FIG. 1 shows an isolation strut 10 usable in the instant invention, having two pneumatic chambers 12 and 14 separated by a piston 16. The piston 16 is connected to a second piston 18 in a separate hydraulic element having two chambers 20 and 22 which are separated and defined by the piston 18. The pistons 16 and 18 are connected to a piston rod 24 with a pivot 26 at the end for attachment to a base. At the other end of the isolation strut is another pivot 28 which is connected to a platform or an item to be supported by the isolation strut 10. Each of the pneumatic chambers 12 and 14 has a port 30 and 32, respectively, to allow air to be provided to or exhausted from the chambers. Likewise, each hydraulic chamber 20 and 22 has a port 34 and 36, respectively, to allow for addition or exhaustion of a hydraulic fluid.

While reference is made to an air suspension spring and to air chambers, it is understood that any compressible gas may be used. Also, appropriate seals (not shown) are used to provide effective isolation between the chambers and between the hydraulic and pneumatic cylinders.

Figure 2:
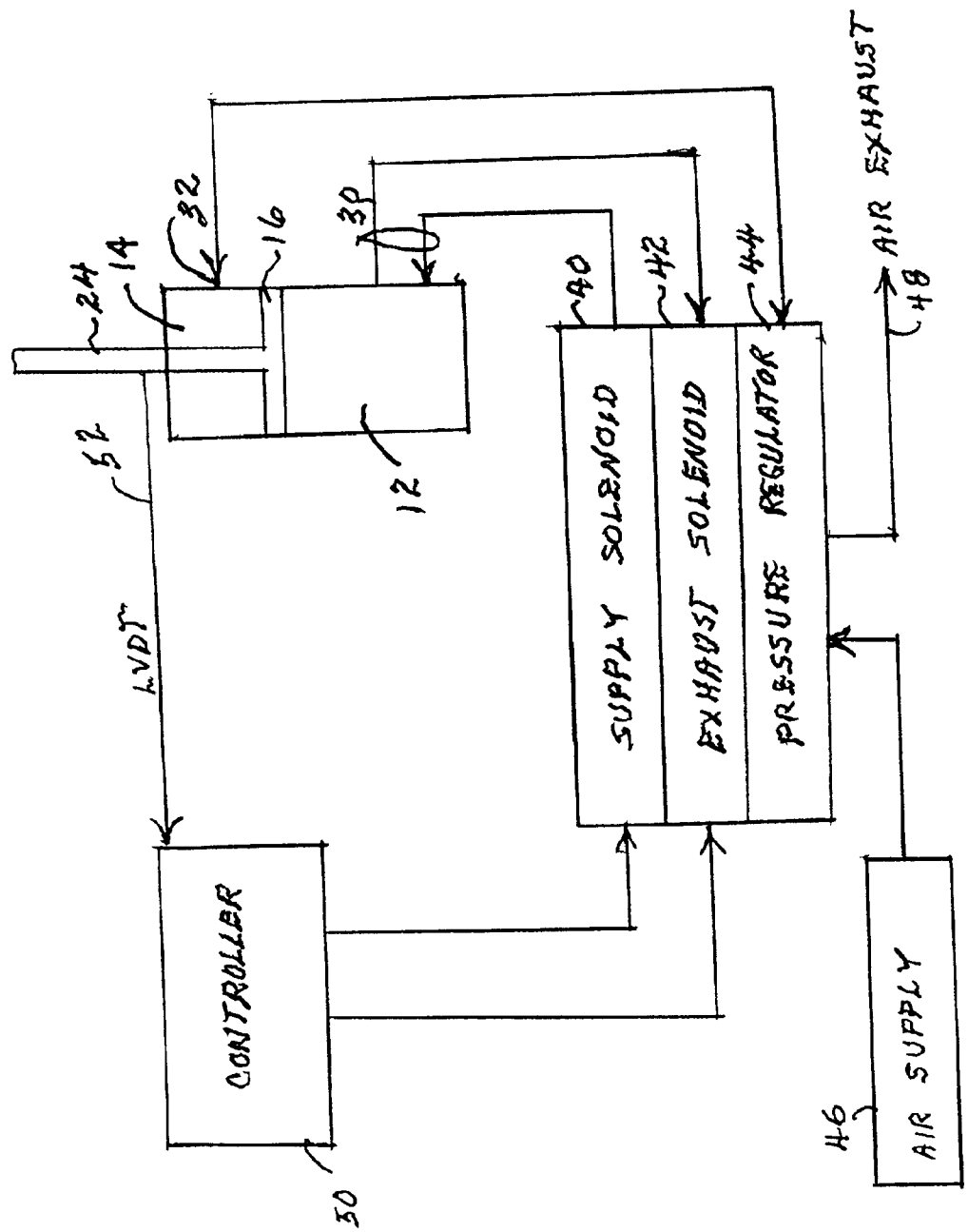
FIG. 2 shows an air suspension spring element of an isolation strut arranged to allow the isolation strut to be set up or reset for stiff load path operation.

FIG. 2 is a schematic diagram showing the pneumatic element of the isolation strut with its various controls in set up and reset mode. In setup and reset mode the length of the isolation strut can be adjusted to a predetermined value to move the attached load or platform to a preferred position.

The pneumatic portion of the isolation strut, or air suspension spring, is shown with its two pneumatic chambers 12 and 14, the piston 16 which defines the two pneumatic chambers, and the piston rod 24 connected to the piston 16. Also shown are a supply solenoid 40, an exhaust solenoid 42, and a pressure regulator 44 which, in combination, control the gas flow into and out of the two pneumatic chambers 12 and 14 through ports 30 and 32. An air supply 46 is shown connected to the pressure regulator and supply solenoid and an air exhaust 48 is connected to the pressure regulator and exhaust solenoid. A controller 50 responsive to a position signal from the piston rod 24, through, perhaps, a linear variable differential transformer turns on or off the supply solenoid 40 and exhaust solenoid 42 to allow air from the air supply to enter the pneumatic chamber 12 or to exhaust air, or gas, from the pneumatic chamber 12 through an air exhaust 48. The pressure regulator 44 supplies or exhausts air from pneumatic chamber 14 as required to maintain a specified air pressure within the chamber. The precise operation of FIG. 2 will be described below with respect to the overall operation of the system.

Figure 3:
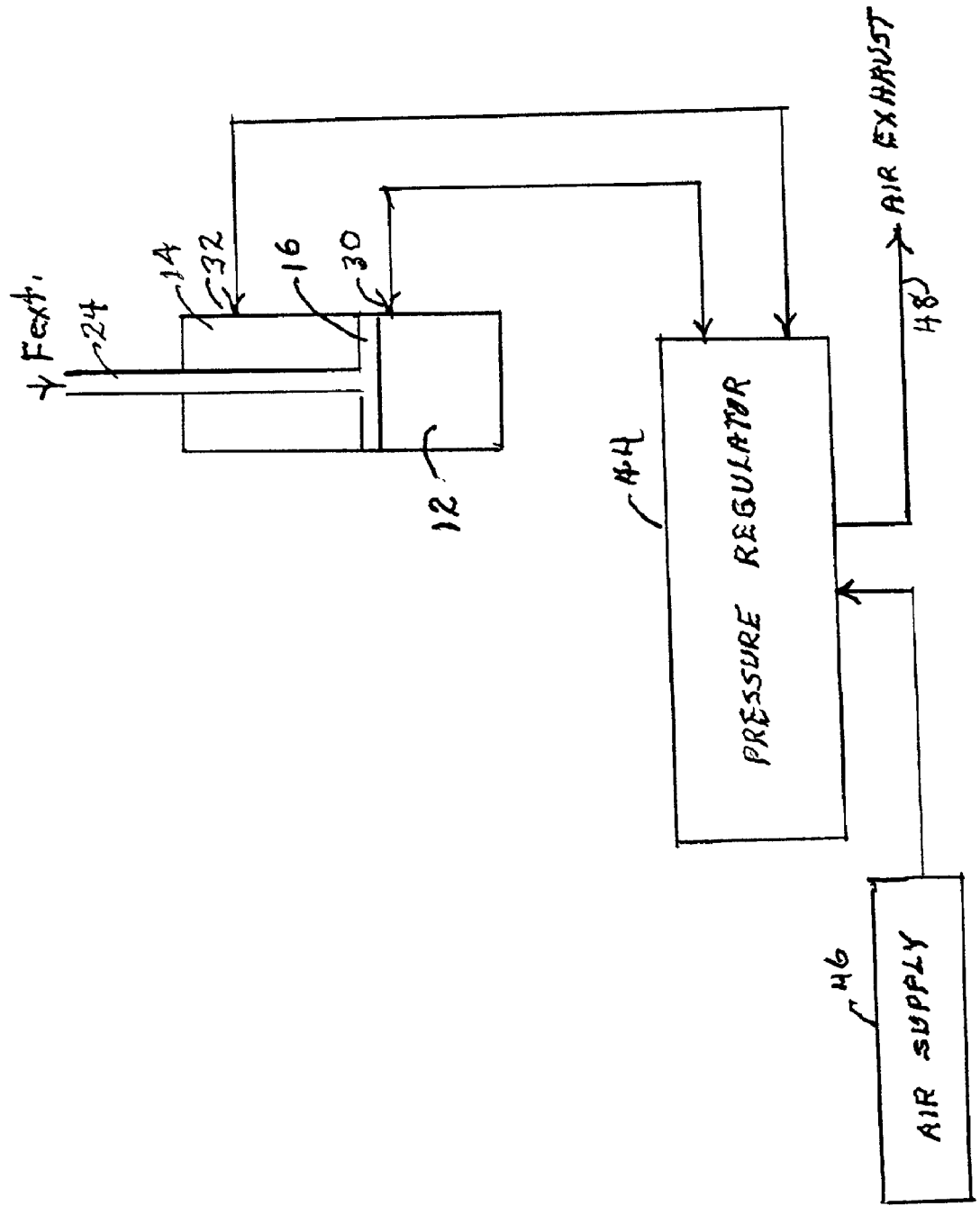
FIG. 3 shows an air suspension spring element of an isolation strut configured for isolation operation.

FIG. 3 shows the air spring or pneumatic element of the isolation strut operational in seismic mode operation. Again the pneumatic chambers 12 and 14 are shown separated by piston 16 which is connected to a piston rod 24. The pressure regulator 44 is shown as supplying and receiving air or gas to each of the chambers of the pneumatic cylinder to maintain a specified air pressure within each chamber for proper seismic mode operation, and also are shown the air supply 46 and the air exhaust path 48.

Figure 4:
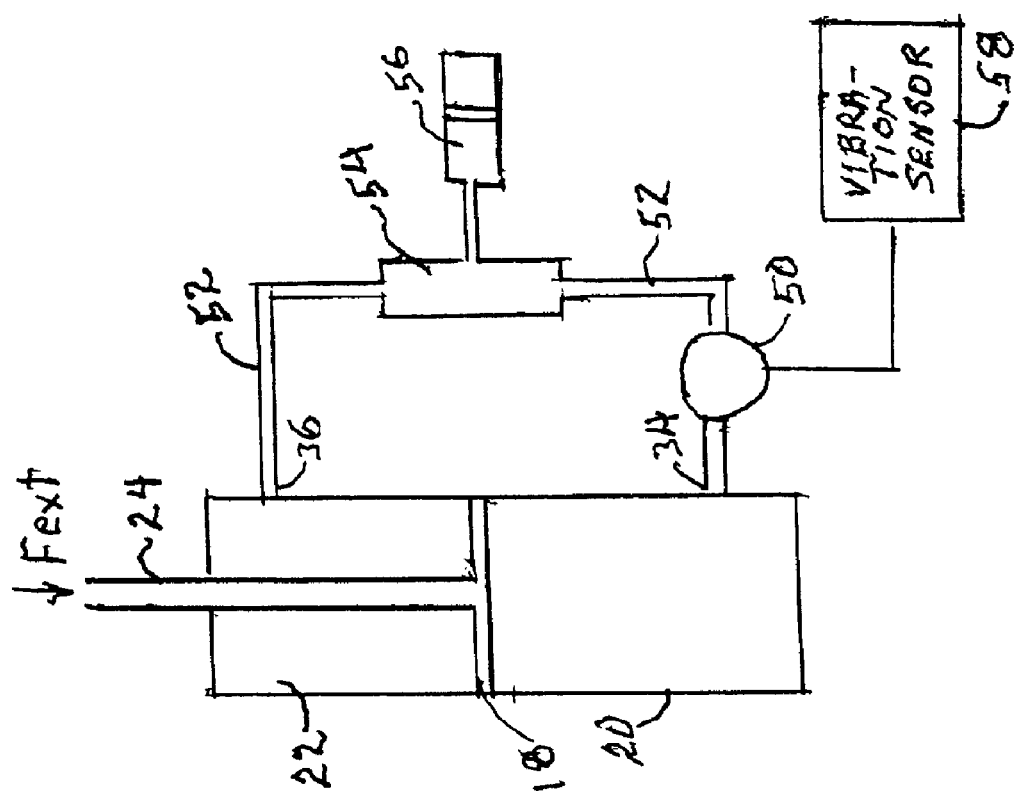
FIG. 4 shows the hydraulic element of an isolation strut connected for isolation lockout or isolation modes.

FIG. 4 shows the hydraulic element of an isolation strut connected for isolation lock-out or isolation modes. The hydraulic cylinder is shown having two chambers 20 and 22 separated by piston 18 which is connected to a piston rod 24 which is common to piston 16 of FIGS. 1, 2, and 3. Piston rod 24 would normally be connected to the load to be supported by the isolation strut. Ports 34 and 36 are shown cooperating with chambers 20 and 22 respectively. Also shown is a solenoid valve 50 in a hydraulic line 52 which couples the ports 34 and 36 through a manifold 54 which, in turn, is connected to a fluid reservoir 56.

Since fluids are relatively incompressible, it is apparent that, when both chambers 22 and 20 are filled with fluid, if the solenoid valve 50 is closed the piston 18, and thereby the piston rod 24 are immobile. Opening the solenoid valve, however, allows fluid to flow between chambers 20 and 22 through hydraulic line 52 as piston 18 may be depressed or extended due to an external force being applied to the piston rod 24. The function of the valve manifold 54 is to provide correspondence between the hydraulic line 52, and thereby ports 34 and 36 and the fluid reservoir 56. The function of reservoir 56, of course, is to maintain an adequate source of hydraulic fluid to insure that chambers 20 and 22 remain full at all times.

In operation, the seismic isolation strut 10 integrates an air suspension spring, shown in FIG. 1 as a pneumatic element having air chambers 12 and 14 separated by a piston 16, and a hydraulic element comprising hydraulic chambers 20 and 22 separated by a piston 18, the two hydraulic chambers being coupled through a hydraulic valve 50 (FIG. 4) to provide a stiff foundation for normal operating conditions, a soft suspension system when triggered by seismic activity, and the ability to reset the system quickly and easily following a seismic event.

For non-earthquake or normal, conditions, a hydraulic valve 50 (FIG. 4) is used to lock the hydraulic cylinder and provide a rigid mount for buildings, structures, or equipment. This effectively prevents piston 16 (FIGS. 1 and 2) from moving since even though the gas used in chambers 12 and 14 (FIGS. 1 and 2) is compressible, the incompressibility of the hydraulic fluid within chambers 20 and 22 of the hydraulic cylinder (FIG. 4) and the common connection of piston rod 24 to both pistons 16 and 18 prevents any motion.

Upon the occurrence of a seismic event, however, vibration sensor 58 opens solenoid valve 50, allowing piston 18, and thereby, piston 16 to move in response to a force applied to piston rod 24. In such an event, the compressibility of the gas in chambers 12 and 14 absorbs the shock of the vibration, while the hydraulic chambers 20 and 22, in cooperation with piston 18 damp any oscillation of piston 16.

Following a seismic event, the system can be reset as shown in FIG. 2. In order to reset the system, controller 50 (FIG. 2) senses the position of piston 16 and operates the supply solenoid 40 and the exhaust solenoid 42 to adjust the pressure in the pneumatic chamber 12 such that the length of the isolation strut is adjusted to a predetermined value to move the attached load or platform to a preferred position. Hydraulic solenoid 50 is then closed to return the system to its stiff-load condition.

Figure 5:
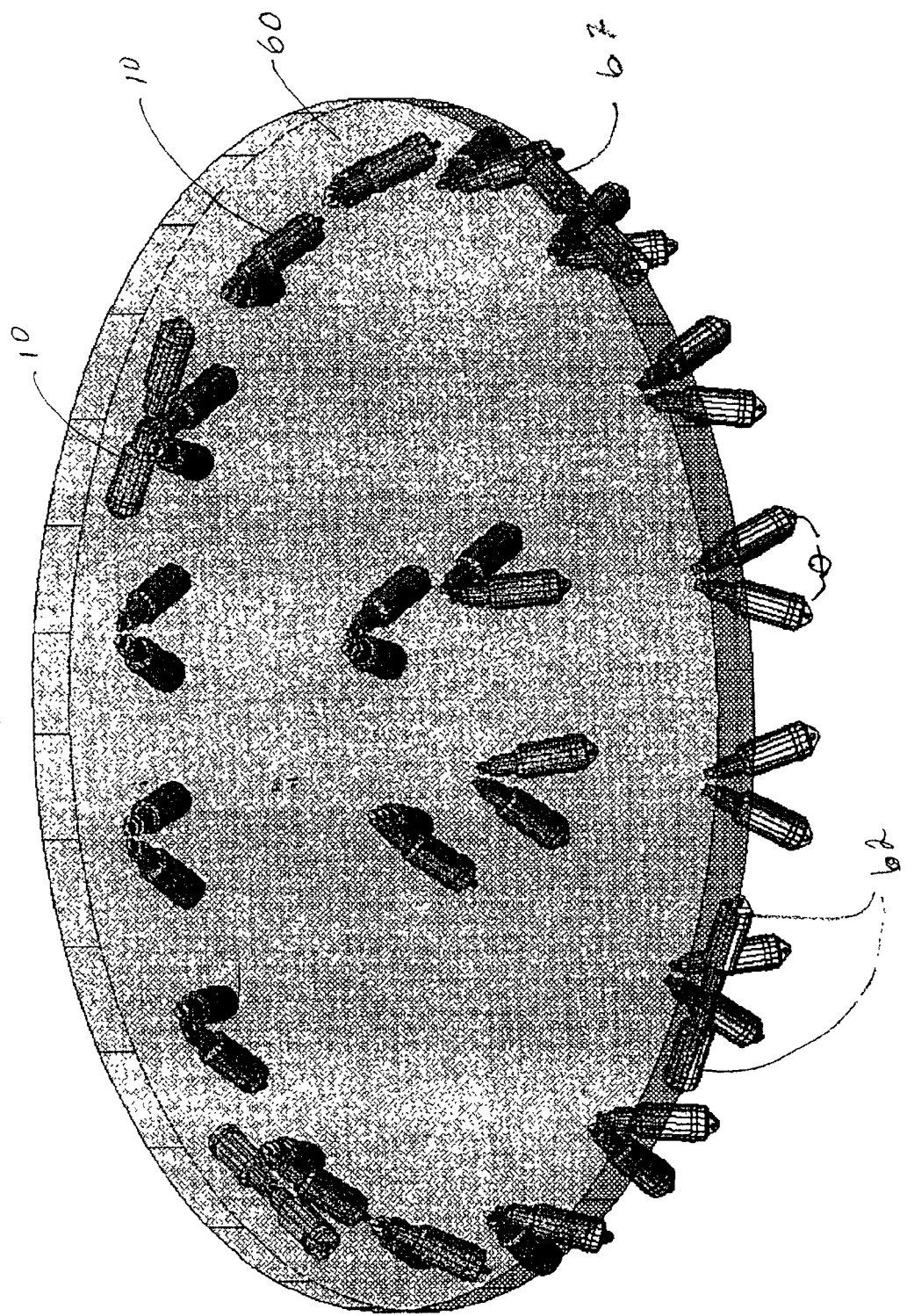
FIG. 5 is a representation of a plurality of isolation struts of the instant invention supporting a platform and allowing stiff mode operation and vibration isolation and damping with six degrees of freedom.

FIG. 5 shows a plurality of isolation struts 10 as described above supporting a platform 60 upon which may be mounted a building, structure, or other equipment. Although twenty four pairs of struts are shown in FIG. 5, the number of struts is dependent upon the load to be supported. The isolation struts may be, as shown, in pairs such that the pairs are mounted at an angle between the earth and the platform so that the common point of the struts supporting the platform provide the necessary freedom to counter vibration in any direction. The angle theta between the pairs of struts can be adjusted to provide the stiffness and damping in the rotational and transverse directions desired to allow motion of the platform (in seismic mode) with six degrees of freedom. Several pairs of isolation struts 62 may be mounted transversely to compensate for rotational forces around an axis perpendicular to the platform.

The strut design of FIG. 1 can be implemented with either a single or dual chamber pneumatic spring design. While a single chamber design is simpler, a change in chamber volume is required to adjust the spring rate for given static load condition. The somewhat more complex dual chamber design, as shown in FIG. 1, provides the ability to adjust the spring rate independently of chamber volume. The pneumatic spring implementation which is most desirable would be dependent on the design requirements of the particular problem, including the degree of motion allowed, allowable operating pressures, and the expected need for stiffness adjustability.

While preferred exemplary embodiments have been presented in the foregoing detailed description of preferred exemplary embodiments, it should be appreciated that a vast number of variations exist. It should also be appreciated that these preferred exemplary embodiments are only examples, and are not intended to limit the scope, applicability, or configuration of the invention in any way. Rather, the ensuing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. An isolation strut for supporting a load above a ground and capable of operating in a first mode and a second mode comprising:

an air suspension spring connected to a load bearing shaft;

a hydraulic damping element having a first chamber and a second chamber separated by a piston connected to the load bearing shaft;

a hydraulic line having a valve therein, one end of the hydraulic line connected to the first chamber and the other end of the hydraulic line connected to the second chamber;

a vibration detector coupled to the valve for actuating the valve upon the occurrence of vibration of an abnormal quality;

whereby, in a first mode of operation the load is rigidly attached to the ground via a structural load path through the hydraulic damping element and in a second mode the load is isolated by the air suspension spring and damped by the hydraulic damping element.

2. An isolation strut as set forth in claim 1 wherein the air suspension spring is a pneumatic cylinder having a piston forming a pair of pneumatic chambers.

3. An isolation strut as set forth in claim 2 further comprising a source of pneumatic fluid in cooperation with the pneumatic chambers for setting the position of the piston forming the pair of pneumatic chambers.

4. An isolation strut as set forth in claim 3 wherein the load is rigidly supported when the position of the piston forming the pair of pneumatic chambers is set.

5. An isolation strut as set forth in claim 4 wherein the load is rigidly supported by closing the valve in the hydraulic line.

6. An isolation strut for supporting a load above a ground and capable of operating in a first mode and a second mode comprising:

an air suspension spring connected to a load bearing shaft for supporting the load;

a hydraulic damping element having a first chamber and a second chamber separated by a piston connected to the load bearing shaft;

a hydraulic line, one end of the hydraulic line connected to the first chamber and the other end of the hydraulic line connected to the second chamber;

a valve in series with the hydraulic line; the valve, in a first mode of operation, preventing the flow of hydraulic fluid between the two hydraulic chambers whereby the load is rigidly attached to the ground;

a vibration detector coupled to the valve for opening the valve in a second mode of operation upon the occurrence of vibration greater than a predetermined quality, such that the load is isolated from the support by the air suspension spring, the action of the air suspension spring being damped by the hydraulic damping element.

7. An isolation strut as set forth in claim 6 wherein the air suspension spring is a pneumatic cylinder having a piston forming a pair of pneumatic chambers.

8. An isolation strut as set forth in claim 7 further comprising a source of pneumatic fluid in cooperation with the pneumatic chambers for setting the position of the piston forming the pair of pneumatic chambers.

9. An isolation strut as set forth in claim 8 wherein the load is rigidly supported when the position of the piston forming the pair of pneumatic chambers is set.

10. An isolation strut as set forth in claim 9 wherein the load is rigidly supported by closing the valve in the hydraulic line.

* * * * *